Aug. 28, 1923.

T. H. WILLIAMS

RIMMING PRESS

Filed Aug. 7, 1922

1,466,079

2 Sheets-Sheet 1

Inventor
T. H. Williams

Aug. 28, 1923.

T. H. WILLIAMS

RIMMING PRESS

Filed Aug. 7, 1922

1,466,079

2 Sheets-Sheet 2

Inventor

T. H. Williams

By Frease and Bond

Attorneys

Patented Aug. 28, 1923.

1,466,079

UNITED STATES PATENT OFFICE.

THOMAS HENRY WILLIAMS, OF AKRON, OHIO, ASSIGNOR TO THE ADAMSON MACHINE COMPANY, OF AKRON, OHIO, A CORPORATION OF OHIO.

RIMMING PRESS.

Application filed August 7, 1922. Serial No. 580,170.

*To all whom it may concern:*

Be it known that I, THOMAS HENRY WILLIAMS, a citizen of the United States, residing at Akron, in the county of Summit and State of Ohio, have invented certain new and useful Improvements in Rimming Presses, of which the following is a specification.

The invention relates to a press for temporarily clamping together the rim rings used in the manufacture of cord tires, for entering and tightening the clamping bolts or loosening and removing the same; and the object of the improvement is to provide a supporting table and disappearing clamping arms which will automatically operate for clamping rings of various sizes.

When a cord tire is built upon an ordinary core and transferred to a resilient core, commonly called an air bag, the beads of the tire stand slightly apart and must be clamped together between rim rings, which must be bolted together before the air bag can be fully inflated and the tire placed in a mold for the vulcanizing process.

Presses have been employed for this purpose which comprise a supporting table resting upon the upper end of an elevator stem, with swinging arms extending upward through radial slots in the table and having hooks on their upper ends and counterweights on their lower ends for swinging the arms outward to automatically engage rim rings of a tire placed on the table, to clamp the same when the table is elevated; and with flexible connections between the upper ends of the swinging arms and the centers of the table to pull the arms inward to clear the rings when the table is lowered.

Difficulty is experienced in the operation of such a rimming press, arising from the fact that the swinging arms always extend upward above the table, and the tire and its rim rings must be lifted over the arms when placed upon or removed from the table; unless perchance the swinging arms are held inward and the table operated above the same, which requires a multiplicity of movements in the operations of the press.

The present improvement involves the use of swinging arms operating upward and outward above the table for engaging rim rings thereon when the table is raised, and operating inward and downward below the top of the table when the same is lowered; so that the tire and rim rings can be freely placed upon and removed from the table by sliding sideways thereon.

The improvement may take the form of the press illustrated in the accompanying drawings, forming part hereof, in which—

Figure 1:
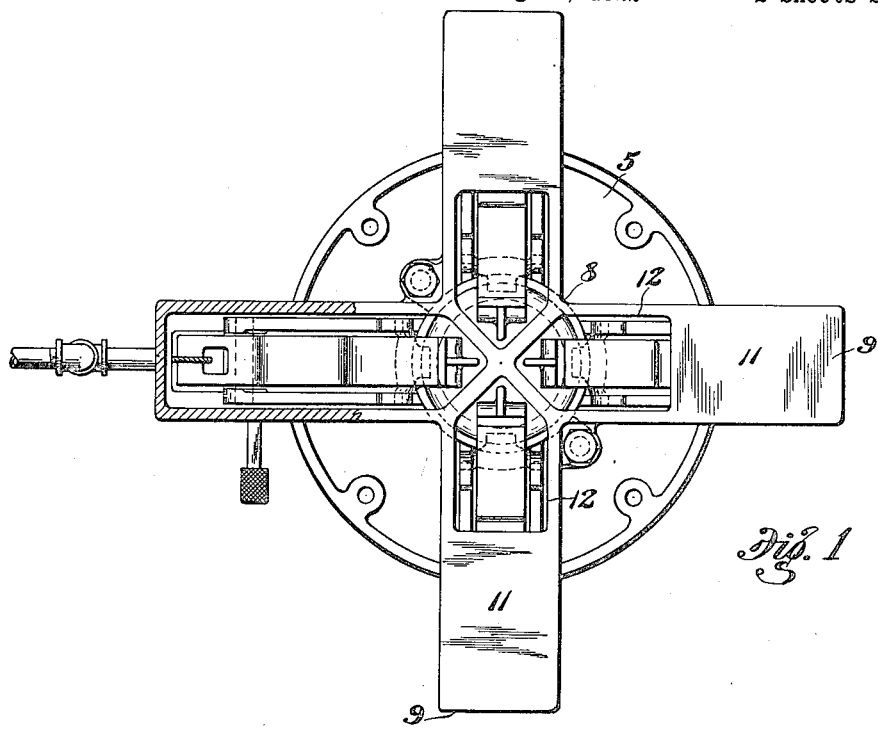
Figure 2:
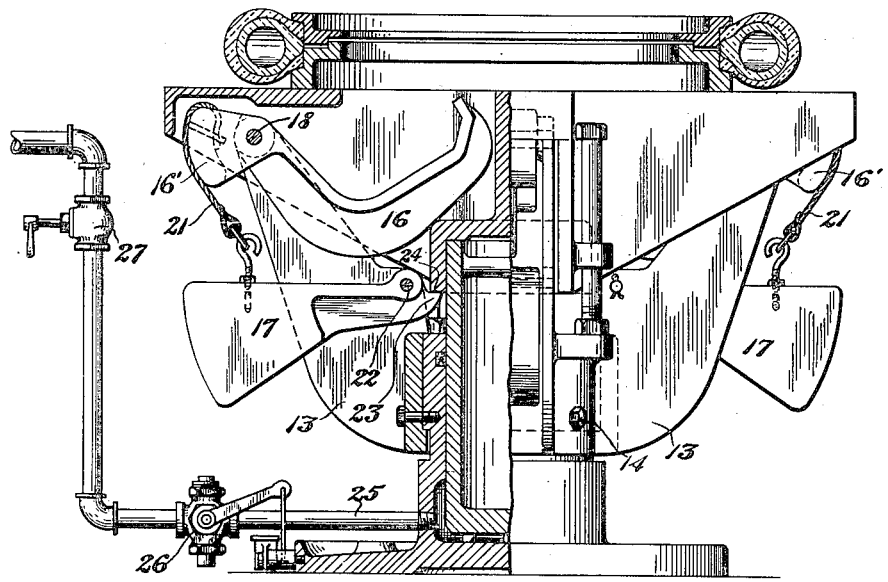
Figure 3:
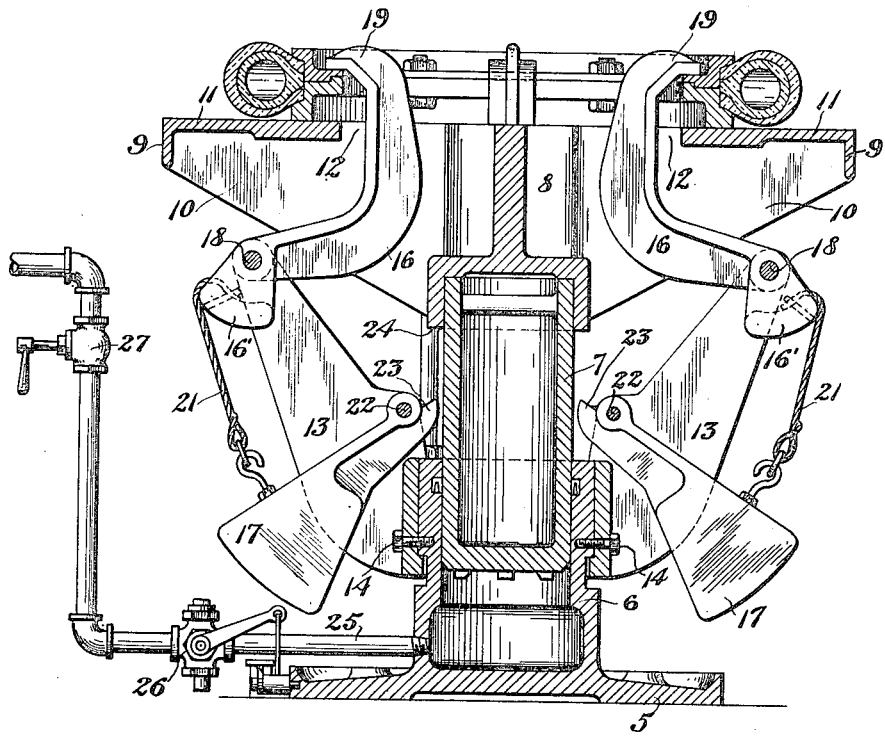
Figure 4:
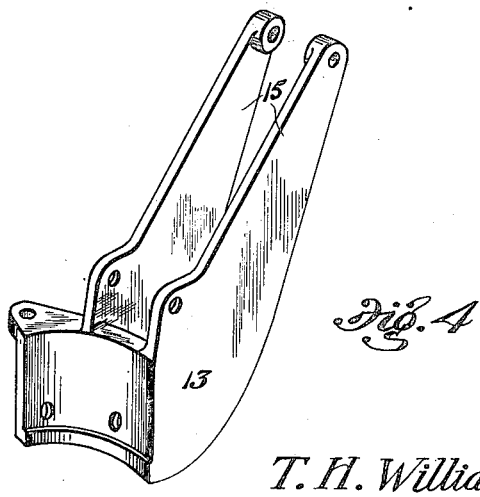

Figure 1 is a plan of the improved rim press with the table in normal or lowered position, with part of one table arm in section to show a full plan of one swinging arm;

Fig. 2, an elevation of the same, showing one-half in section, as on line 2—2, Fig. 1;

Fig. 3, an elevation axial section of the press with the table in raised or operative position, showing a tire and rim rings thereon clamped by the swinging arms; and Fig. 4, a detached perspective view of one pair of swinging arm brackets.

Similar numerals refer to similar parts throughout the drawings.

The press includes a base 5 having an upright cylinder 6 thereon, in which operates as a piston the elevator stem 7 of a table 8, which may be in the form of hollow cross arms 9, each arm having side walls 10 connected at their outer ends by bearing plates 11 so as to leave openings 12 between their inner ends.

A plurality of brackets 13, corresponding to the cross arms of the table, are secured to the upright cylinder, as by means of cap screws 14, and each bracket may be in the form of parallel arm plates 15 extending upward between the side walls of the table arms. Between the upper ends of each set of bracket arms is pivotally mounted an inwardly extending swinging arm 16, and between the lower ends thereof is pivotally mounted an outwardly extending counterweight 17.

Each swinging arm 16 extends inward from its pivotal bearing 18 and thence at an angle upward to an out-turned hook 19 on its free end; and extending outward from its pivotal bearing 18 is formed an arcuate lug 16', around which is secured the upper end of a depending chain or cable 21, by means of which the swinging arm may operate upward.

Each counterweight 17 extends outward from its pivotal bearing 22 between and beyond the arm plates of its bracket, and near its outer end is connected with the cable 21 depending from the outer end of a corresponding swinging arm. Each counterweight is provided with a cam finger 23 extending inward from its pivotal bearing 22 under an abutment 24 on the side of the piston stem 7 of the table.

The parts are so proportioned and arranged that when the table is lowered into normal position, as shown in Fig. 2, the abutments 24 will impinge the fingers 23 and carry them downward to carry the counterweights 17 upward into normal inoperative position as shown in Fig. 2; thereby raising the pendent cables 21 and permitting the hooked arms 16 to swing downward by their own weight to inoperative position with their hooked ends below the top of the table, as shown in the same figure.

The table may be raised or operated upward by means of compressed air or water or oil received through a supply pipe 25, which may be controlled by a release valve 26 and an inlet valve 27; and during an initial upward movement of the table the rising of the abutments 24 elevates them from the fingers 23 and permits the counterweight to swing downward, which causes the hooked arms to swing upward and outward to engage and clamp the rim rings upon a tire, as shown in Fig. 3; it being understood that before operating the table upward a tire with rim rings has been placed in approximate position thereon, and that the hooked ends of the swinging arms will swing over the rings before the rings engage the hooks, after which the rings are clamped together by a further raising of the table with the hooks in engagement with the rings.

The flexible cable connection of the hooks with their counterweight permits each hook to operate independently of the other, and causes each hook to swing into engagement with a rim ring even though it may not be positioned exactly central of the table; and it is evident that when the table is lowered, the hooks will automatically swing downward just as soon as the abutments 24 impinge the fingers 23 and relieve the hooks from the pull of the counterweights; whereupon the hooked arms will disappear below the top of the table and permit the tire and the rim rings secured thereon, to be readily removed from the table.

I claim:

1. A press for tire rim rings and the like including a table, means for elevating the table, and swinging arms normally dropping below the table when the same is lowered and operable upward for engaging and clamping rings on the table when the same is elevated.

2. A press for tire rim rings and the like including a table having openings therein, means for elevating the table, and rim engaging arms normally dropping below the table when the same is lowered and operable through the openings for engaging and clamping rings on the table when the same is elevated.

3. A press for tire rim rings and the like including a table, means for elevating the table, rim engaging arms operable above and below the table, and yielding means rendered inoperative by a lowering of the table, for swinging the arms upward to engage and clamp rings on the table when the same is elevated.

4. A press for tire rim rings and the like including a table, means for elevating the table, rim engaging arms operable above and below the table, and independent yielding means, rendered inoperative by a lowering of the table, for swinging the arms upward to engage and clamp rings on the table when the same is elevated.

5. A press for rim rings and the like including a table, means for elevating the table, rim engaging arms operable above and below the table, and yielding means swinging the arms upward to engage and clamp rings on the table, and means actuated by the lowering of the table for rendering the yielding means inoperative.

6. A press for tire rim rings and the like including a table, means for elevating the table, rim engaging arms normally dropping by their weight below the table, counterweights swinging the arms upward to engage and clamp rings on the table when the same is elevated, the arms being relieved of the action of the weights by the lowering of the table.

7. A press for tire rim rings and the like including a table, means for elevating the table, rim engaging arms operable above and below the table, counterweights having cable connections with the engaging arms for swinging them upward to engage and clamp rings in the table when the same is elevated, and means actuated by the lowering of the table to relieve the engaging arms from the action of the counterweights.

THOMAS HENRY WILLIAMS.